United States Patent

[11] 3,623,438

| [72] | Inventor | Paul J. Cardinal, Jr. |
| --- | --- | --- |
|  |  | Brisbane, Calif. |
| [21] | Appl. No. | 812,609 |
| [22] | Filed | Apr. 2, 1969 |
| [45] | Patented | Nov. 30, 1971 |
| [73] | Assignee | BSP Corporation |
|  |  | Brisbane, Calif. |

[54] DEWATERING OF SEWAGE SLUDGE
6 Claims, 1 Drawing Fig.

| [52] | U.S. Cl. | 110/8 R |
| --- | --- | --- |
| [51] | Int. Cl. | F23g 5/00 |
| [50] | Field of Search | 110/7, 8, 15; 210/10, 375, 376, 377 |

[56] References Cited
UNITED STATES PATENTS

| 2,056,885 | 10/1936 | Pecker | 210/375 |
| --- | --- | --- | --- |
| 2,230,385 | 2/1941 | Pecker | 110/8 |
| 3,329,107 | 7/1967 | Hatchel et al. | 110/15 |
| 600,597 | 3/1898 | Rissmuller | 110/8 X |
| 1,453,678 | 5/1923 | Howell | 210/377 X |
| 1,827,681 | 10/1931 | Vander Molen | 210/375 X |
| 2,277,718 | 3/1942 | Sanders | 210/10 |
| 3,038,611 | 6/1962 | O'Conor et al. | 210/376 X |
| 3,397,140 | 8/1968 | Dea | 210/10 |

*Primary Examiner*—Kenneth W. Sprague
*Attorney*—Flehr, Hohbach, Test, Albritton & Herbert

ABSTRACT: Apparatus and process for dewatering sewage sludge produced in a tertiary raw sewage treating procedure. Successive charges of predetermined amounts of sewage sludge are introduced into a batch-type dewatering device, such as a centrifuge, and processed therein to remove excess fluid. The dewatered sludge is collected and fed as a continuous stream into a sludge incinerator, such as a multiple hearth furnace. Batch dewatering produces a drier sludge cake, thus permitting use of a smaller incinerator for given production rates with substantial reduction in operating costs and capital outlay.

PATENTED NOV 30 1971 3,623,438
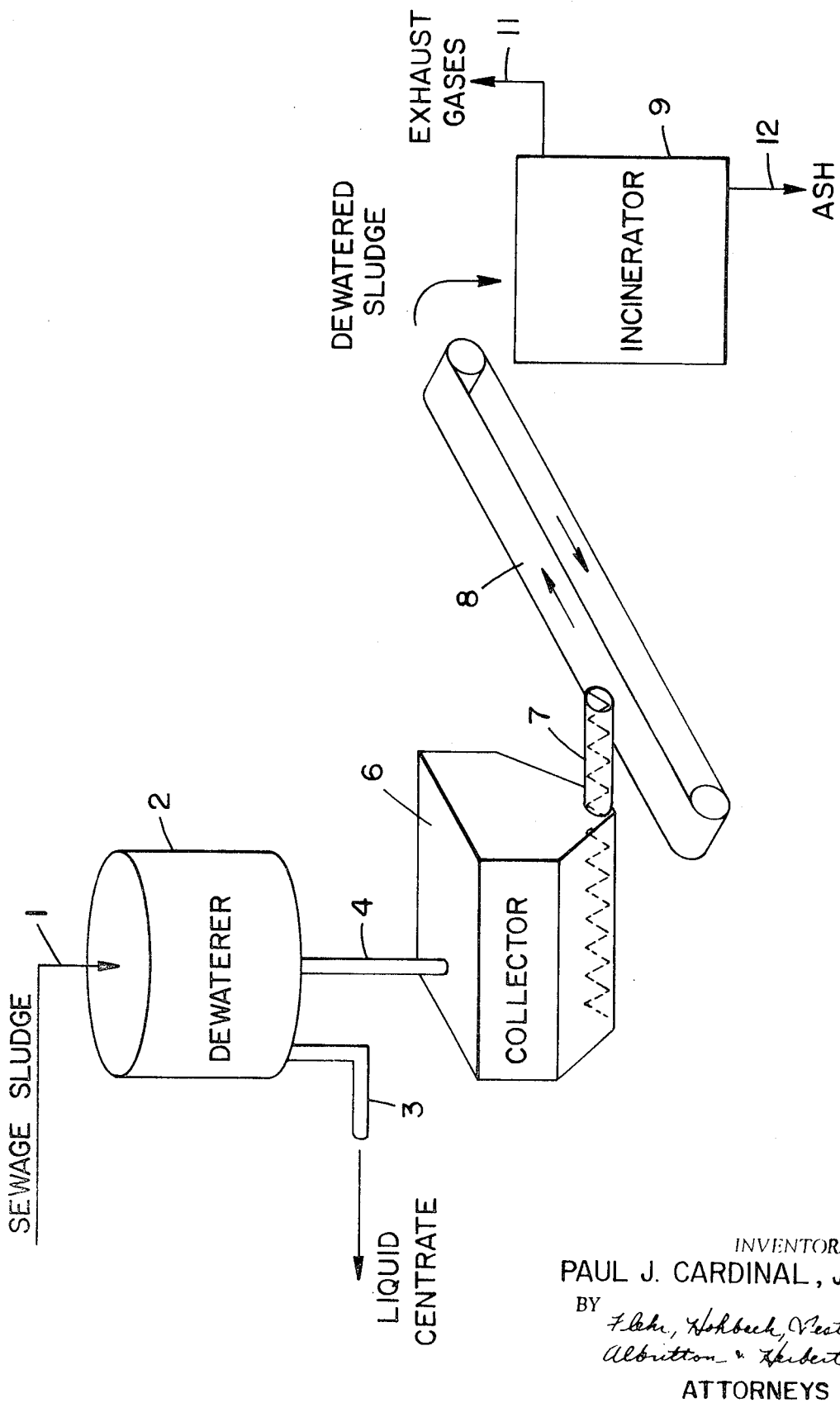
INVENTOR.
PAUL J. CARDINAL, JR.
BY
Flehr, Hohbach, Test,
Albritton & Herbert
ATTORNEYS

DEWATERING OF SEWAGE SLUDGE

BACKGROUND OF THE INVENTION

1. Field of the Invention

This invention relates generally to the field of removing excess liquid from sewage sludge produced in a tertiary or like sewage treating plant. More particularly, this invention relates to sewage dewatering, collecting, and incinerating apparatus, and a process employing such apparatus in treating sludge produced in a tertiary or like sewage-treating procedure. Still more particularly, this invention relates to the field of dewatering sludge by centrifugal action, coupled with subsequent incinerating of the dewatered sludge for disposal or selective reuse.

2. Description of the Prior Art

Heretofore, sewage sludge produced in a conventional tertiary raw sewage treating procedure has been incinerated to permit disposal or selective reuse. It has been the common practice heretofore to combine vacuum filtration with continuous centrifugation of sewage sludge solids prior to introduction thereof into the incineration apparatus.

So far as is known, the basic concept disclosed in this apparatus, namely of batch dewatering sewage sludge obtained from a tertiary treating procedure in an intermittent batch infeed and outfeed process, coupled with subsequent collection of dewatered sludge batches for use in providing a continuous stream of dewatered sludge to an incinerator, has not been utilized heretofore.

Continuous sludge dewatering, by utilizing continuous centrifugation procedures, has been found to be considerably less effective in removing excess fluid from sewage sludge in comparison to the intermittent batch dewatering procedure employed with this invention. By utilizing batch dewatering, it has been found that a drier sludge cake is produced which permits utilization of a smaller size incinerator, for given production rates, operable at substantial savings when compared to the larger incinerators required heretofore in continuous dewatering operations.

SUMMARY OF THE INVENTION

This invention relates to an improved process, and apparatus for carrying out such process, for dewatering sewage sludge obtained from a raw sewage tertiary treating procedure or the like. More particularly, this invention relates to the batch dewatering of sewage sludge prior to introduction of the dewatered sludge into an incinerator for subsequent disposal or selective reuse.

Still more particularly, this invention relates to an apparatus combination, including a batch-type dewatering device for sewage sludge, a collector for accumulating successive batches of sludge discharged from the dewatering device, and means for feeding a continuous stream of dewatered sludge from the collector into an incinerator, such as a multiple hearth furnace. The process for utilizing such apparatus in an improved sludge dewatering system and procedure also is an important aspect of this invention.

From the foregoing it should be understood that objects of this invention include: the provision of an improved sewage sludge dewatering and incinerating procedure, and apparatus for effecting such procedure; the provision of a sludge dewatering procedure which produces a drier dewatered sludge than produced heretofore, with attendant savings in incinerator capital outlay costs; and the provision of a sludge dewatering procedure and apparatus which utilizes a batch-type centrifuge dewatering device in which predetermined charges of sewage sludge are introduced, treated and discharged in succession for subsequent incineration.

These and other objects of this invention will become apparent from a study of the following disclosure in which reference is directed to the attached drawing.

BRIEF DESCRIPTION OF THE DRAWING

FIG. 1 is a schematic view of a preferred embodiment of the apparatus combination utilized in effecting dewatering and incinerating of sewage sludge by the process of this invention.

DESCRIPTION OF THE PREFERRED EMBODIMENT

Incinerators, such as multiple hearth furnaces, are and have been widely utilized as an effective means of disposing of sewage sludge produced in a tertiary raw sewage treating procedure or the like. However, sludge to be incinerated in a multiple hearth furnace obtained from prior known procedures frequently contains excess fluid which hinders, or makes unnecessarily difficult and expensive, effective and efficient incineration of such sludge introduced into the furnace. Heretofore, such sludge prior to incineration has been dewatered in a continuous operation, utilizing vacuum filtration and/or continuous centrifugation steps and equipment.

The wetness of the sewage sludge introduced into the incinerator is very important because the effectiveness and production rate of the incinerator are directly related to the moisture content of the sludge. Additionally, it has not been uncommon for the liquid separated from the sludge with prior known continuous procedures to contain solids that produce an additional treating problem. It has been particularly noted that the sludge obtained from the secondary treating step of a tertiary treating procedure has been particularly difficult and costly to dewater and incinerate because of their high moisture content.

The present invention has been designed to make specific improvements upon procedures and apparatus combinations utilized heretofore to produce a drier dewatered sludge which may be more easily and more completely incinerated, and which permits utilization of furnaces of smaller size than utilized heretofore with attendant capital investment and operating cost savings.

To that end, it has been found that an improved and drier dewatered sludge produce may be obtained if predetermined sludge charges, defined by predetermined quantities of sludge, are dewatered in a successive batch-type operation rather than in a continuous operation of the type utilized heretofore. To that end, a batch dewatering device and procedure are utilized upon successive charges of sewage sludge prior to introduction thereof into an incinerator.

In the preferred embodiment illustrated, successive batches of dewatered sludge are collected from one or more batch-type dewatering devices and the dewatered sludge is thereafter withdrawn as required to provide a source of dewatered sludge for the incinerator, which preferably is of the multiple hearth type. Thus, a continuous flow of comparatively low moisture content dewatered sludge may be provided for introduction into an incinerator in accordance with the predetermined capacity of the particular incinerator being utilized.

In that connection, reference is directed to the FIG. 1 in which a schematic illustration of the apparatus combination utilized in effecting the improved sludge dewatering process of this invention is illustrated. As shown, a quantity of sewage sludge, obtained from a tertiary or like raw sewage treating procedure, is introduced through conduit 1 into a dewatering device. 2. Preferably, the dewatering device is a centrifuge unit designed to operate upon successive batches of sewage sludge, each of predetermined quantity, introduced thereinto in sequence from the sludge supply. The successive batches of sludge are fed into, processed in, and discharged from the dewaterer 2 in a series of successive step dependent upon the capabilities and incinerating requirements of the sludge dewatering and incinerating system.

The liquid centrate separated from the sludge solids in the dewaterer is discharged through conduit 3, for reintroduction into the tertiary treating system or for disposal as may be desired.

The dewatered sludge solids are discharged as a cake through conduit 4 for subsequent handling. Upon discharge of each batch of dewatered sludge solids from the dewaterer, a subsequent batch of sludge is introduced into the dewaterer for treatment therein.

In the embodiment illustrated, each batch of sludge dewatered in centrifuge 2 is introduced into a bin or like collector 6 from which the dewatered sludge may be selectively withdrawn and transferred for subsequent incineration. In that connection, the collector is utilized in conjunction with means for continuously withdrawing sludge cake from the collector and introducing the same as a continuous stream into the incinerator.

The continuous feed means utilized includes a mechanism for withdrawing dewatered sludge form the collector 6 and for thereafter transferring the withdrawn sludge into the incinerator. To that end, a screw conveyor 7 is positioned to extend along the bottom of the collector for withdrawing a continuous stream of sludge therefrom in selective quantities as desired. Alternatively, other mechanism for withdrawing sludge form the collector may be utilized, such as a reciprocating piston feeding device or the like.

Sludge withdrawn from the collector by the illustrated screw conveyor is transferred by a continuous belt conveyor 8 and is discharged from the belt conveyor into the incinerator 9 in which the sludge is burned in the manner well known heretofore. While a continuous belt conveyor has been illustrated as the transfer portion of the means for conveying sludge from the collector to the incinerator, it should be understood that other transfer means, such as a screw or tubular conveyor, may be utilized also.

In furnace 9, the sludge is burned. The exhaust gases produced during such burning are carried from the incinerator through conduit 11 for subsequent treatment, disposal or selective reuse, in known fashion. The incinerated ash produced in the furnace is discharged through conduit 12 for disposal or selective treatment and reuse, also as known heretofore.

The simplified dewatering and incinerating procedure described, depending upon the capacity of the furnace 9 utilized, may be employed in conjunction with second and third or more dewatering devices of the batch-type described. Each such dewaterer may be positioned to discharge its dewatered product directly into a single collector 6, or additional collectors may be utilized in conjunction with the additional dewatering devices employed. If the incinerating system utilizes a furnace of large size, it may be desirable to utilize two or more dewatering devices in sequence as noted to insure that a continuous stream of dewatered sludge is available for feeding into the incinerating furnace in a continuous burning operation.

It should be understood, of course, that, although the centrifuge-type dewaterer preferably employed with this invention operates intermittently on the batch principle, infeed and outfeed thereof may be regulated automatically so that attention of an operator at the dewatering stage is not specifically required, except for supervisory functions. Of course, if preferred, the infeed and outfeed sequences of the dewatering device may be regulated manually, depending upon plant requirement and personnel availability.

The batch-type centrifuge utilized has been found to produce a drier sludge cake than a continuous centrifuge, thus permitting a smaller and less expensive incinerator furnace 9 to be utilized which operates with less fuel consumption or no fuel consumption at all depending upon the nature and moisture content of the dewatered sludge introduced thereinto. Heretofore,, continuous centrifuge and continuous vacuum filter operations carried out on sewage sludge resulted in a sludge cake containing approximately 16 to 22 percent solids. With the improved apparatus and process of this invention utilizing a batch-type dewatering procedure, a sludge cake containing approximately 22 to 35 percent solids is producible, with the exact solid percentage obtained depending upon the nature and origin of the sewage sludge introduced into the dewatering device. As noted previously, sludges form the primary treating step and the secondary treating step of a tertiary raw sewage treating procedure will vary substantially in their moisture content, thereby resulting in dewatered sludge cakes of varying moisture contents.

By way of specific comparative example, heretofore sludge dewatered in a continuous operation contained typically 17 percent solids. At a continuous centrifuge rate producing 1,000 pounds of dewatered sludge per hour, the furnace infeed rate required is 5,800 pounds per hour. However, using a batch-type centrifuge, a drier dewatered product containing 25 percent solids may be readily produced, thereby requiring only 4,000 pounds per hour furnace infeed rate from the same dewatering rate of 1,000 pounds per hour. As a result, for the same dewatered sludge centrifuge outflow rate, an incinerator 30 percent smaller than that required for treating sludge from continuous vacuum and/or centrifuge filtration may be utilized. The drier dewatered product produced results in a substantial savings in fuel costs in the furnace due to the lower moisture content in the sludge. Such fuel costs may even be eliminated entirely in certain cases due to the self-burning characteristics of the drier sludge produced in the batch process described.

By utilizing a furnace infeed arrangement of the type illustrated and described, intermittent dewatering of successive sludge batches of predetermined size (determined in accordance with the capacity of the incinerating furnace utilized therewith) permits continuous infeed to the incinerator for efficient utilization of its burning capability.

Having thus made a full disclosure of the subject simple, yet highly effective, dewatering sludge process and apparatus combination, reference is directed to the appended claims for the scope of protection to be afforded thereto.

I claim:

1. In combination in a sewage-treating plant, an incinerator for burning sewage sludge, a batch-type dewaterer into which successive charges of predetermined amounts of sewage sludge are introduced intermittently and serially as discrete batches for fluid removal therefrom as successive batches prior to discharge thereof from said dewaterer as successive batches for subsequent introduction into said incinerator, feed means for receiving serially successive batches of dewatered sludge from said dewaterer and for introducing the same as a continuous stream into said incinerator, and a collector interposed between said dewaterer and said continuous feed means in which quantities of successive batches of dewatered sludge are serially accumulated from said dewaterer for withdrawal in accordance with predetermined requirements for introduction into said incinerator.

2. The combination of claim 1 in which said dewaterer is a batch-type centrifuge.

3. In combination in a sewage-treating plant, an incinerator for burning sewage sludge, and at least two batch-type dewaterers into which successive charges of predetermined amounts of sewage sludge are introduced intermittently and serially as discrete batches for fluid removal therefrom as successive batches prior to discharge thereof from said dewaterer as successive batches for introduction into said incinerator, said dewaterers being correlated to produce dewatered sludge in predetermined amounts sufficient to provide a continuous flow into said incinerator in accordance with the predetermined operating capacity of said incinerator.

4. A process of treating sewage sludge produced in a tertiary sewage-treating procedure or the like, comprising introducing a predetermined batch charge of said sewage sludge into a batch-type dewatering device, serially dewatering successive batches of sludge in said device as successive batches, thereafter discharging such dewatered sludge as successive batches from said device for subsequent introduction into said incinerator, collecting said successive batches of dewatered sludge to accumulate the same in quantities sufficient to insure continuous feed thereof into said incinerator in accordance with a predetermined capacity of said incinerator, and introducing said dewatered sludge as a continuous stream into said incinerator.

5. The process of claim 4 which includes serially dewatering additional successive batches of sewage sludge in another dewatering device, and collecting such additional successive batches of dewatered sludge with said first-mentioned successive batches prior to introduction of such dewatered sludge into said incinerator.

6. The process of claim 4 in which said sewage sludge is centrifuged in said dewatering device to remove fluid therefrom.

* * * * *